United States Patent [19]

Davis et al.

[11] 4,301,626
[45] Nov. 24, 1981

[54] INFLATABLE HEAT BARRIER

[75] Inventors: Donald L. Davis, Mount Laurel; Adolph J. Strohlein, Jr., Moorestown, both of N.J.

[73] Assignee: Effective Conservation Systems, Inc., Dayton, Ohio

[21] Appl. No.: 157,580

[22] Filed: Jun. 9, 1980

[51] Int. Cl.³ .............................................. E04B 1/34
[52] U.S. Cl. ............................................ 52/2; 52/22; 47/17
[58] Field of Search ..................... 52/2, 17, 22, 404; 47/17, 28.1

[56] References Cited

U.S. PATENT DOCUMENTS

| | | | |
|---|---|---|---|
| 2,854,014 | 9/1958 | Hasselgaist | 52/2 |
| 3,249,682 | 5/1966 | Laing | 47/28.1 |
| 3,375,321 | 3/1978 | Laing | 47/17 |
| 3,481,073 | 12/1969 | Yoshida | 47/17 |
| 3,987,592 | 10/1976 | Herminghaus | 52/3 |
| 3,999,333 | 12/1976 | Amarantos | 52/2 |
| 4,027,437 | 6/1977 | Monsky | 47/17 |

FOREIGN PATENT DOCUMENTS

| | | | |
|---|---|---|---|
| 2208712 | 8/1973 | Fed. Rep. of Germany | 52/2 |
| 1237283 | 6/1960 | France | 52/2 |
| 2403428 | 4/1979 | France | 52/2 |
| 1385261 | 2/1975 | United Kingdom | 52/2 |

*Primary Examiner*—Price C. Faw, Jr.
*Assistant Examiner*—Henry E. Raduazo
*Attorney, Agent, or Firm*—Biebel, French & Nauman

[57] ABSTRACT

A heat convection barrier particularly adapted for use with greenhouses and warehouses consists of a series of inflatable tubes which are suspended beneath the roof of a structure and inflated into contact with each other to form a barrier against heat loss through the roof. Each of the tubes includes an integrally formed seam by which the tubes are suspended beneath the roof and an inflatable main body portion, and the tubes are spaced from each other a distance less than the inflated diameters of the main body portions so that when they are inflated they contact each other and form a continuous barrier. One end of each of the tubes is tied off and the opposite ends are split and wrapped about an apertured conduit and a low pressure fan or blower communicates with one end of the conduit to inflate the tubes. When it is desired to heat the roof of the structure to, for example, eliminate snow loads, the fan or blower may be turned off, allowing the tubes to deflate so that warm air may pass upwardly between the deflated tubes and contact the roof. Alternatively a conduit can be inserted between an adjacent pair of inflated tubes to permit warm air to be pumped into the space between the roof and the tubes.

2 Claims, 8 Drawing Figures

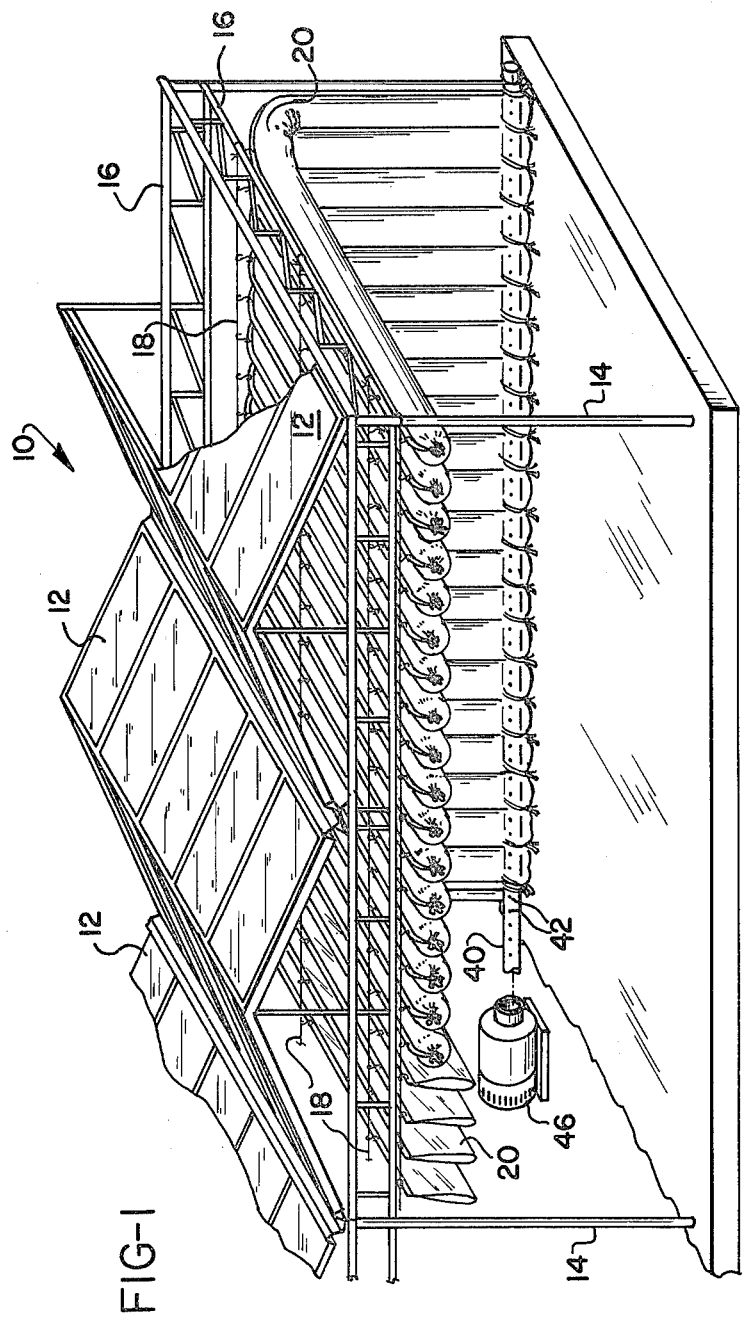

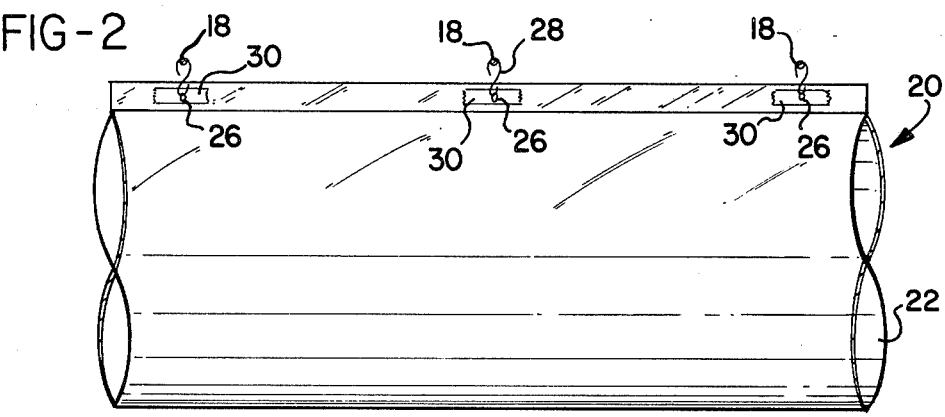
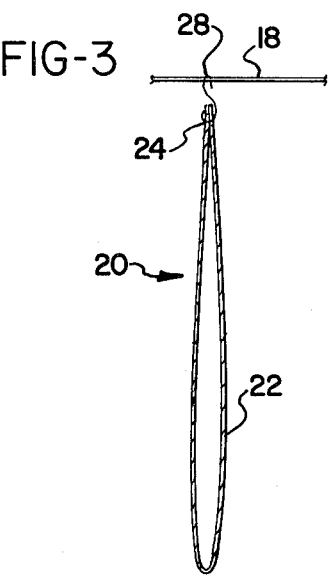
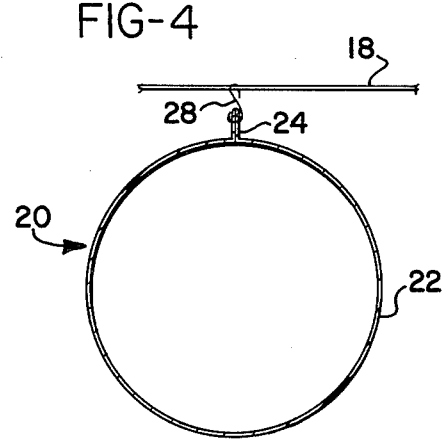
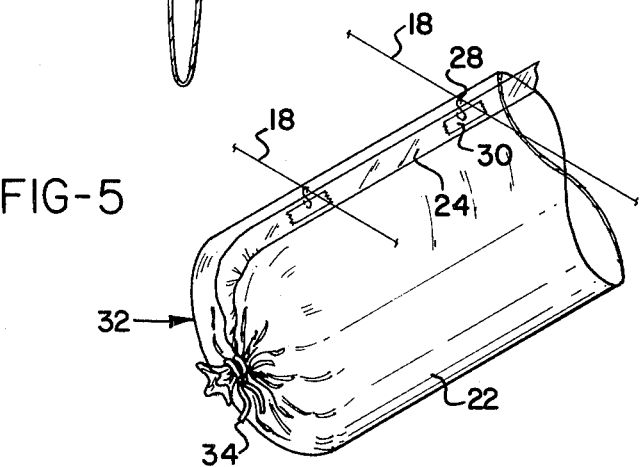

INFLATABLE HEAT BARRIER

BACKGROUND OF THE INVENTION

Inflatable building structures are known in the art, as indicated by U.S. Pat. No. 4,012,867, Mar. 22, 1977, which discloses a greenhouse or similar structure of a quonset configuration which includes inflatable walls. Additionally, U.S. Pat. No. 4,027,437, June 7, 1977, discloses an inflatable building that includes a skeletal framework over which are placed inflatable tubular members. While directed to inflatable building structures, each of these patents contemplates a structure which is initially designed as an inflatable structure and in which the inflatable portions constitute the outer surface of the building and are directly exposed to the elements.

It is also known to apply inflatable blankets over the roofs of buildings such as greenhouses, or attach such blankets beneath the roof. Of course, where the blankets are laid over the exterior surface of the roof they are exposed to the elements and deteriorate after a relatively short period of use. With an interior installation in the climates in which such insulating blankets are necessary, provision will usually be necessary for removing the blankets to allow warm air to contact the undersurface of the roof to eliminate snow loads.

SUMMARY OF THE INVENTION

The present invention comprises an insulating system for existing structures such as greenhouses and warehouses which is efficient, relatively inexpensive and capable of simplified installation.

Thus, in accordance with the present invention a plurality of tubular members are provided, each of which includes an outwardly projecting seam extending co-extensively with a main, inflatable body portion of the tubular member. The seam serves as an attaching flange for suspending the tubes beneath the roof of the structure, and the tubes can be conveniently inflated by attaching them to a perforated conduit which is provided with a small, low pressure blower.

The tubes are preferably spaced apart a distance less than the diameters of their inflatable main body portions, so that when they are inflated they contact each other and form a substantially continuous heat barrier. However, because the tubes are inflated to a relatively low pressure, condensate that forms between the upper surfaces of the tubes and the lower surface of the roof merely passes down between the inflated tubes, rather than building up to any appreciable amount. Additionally, the tubes readily conform themselves to existing pipes and other structures, which may pass up between adjacent inflated tubes.

In this regard it should also be noted that it is a relatively simple matter, if desired, to insert a conduit between an adjacent pair of tubes and pump warm air up into the space between the roof and tubes to melt any accumulated snow on the roof. Alternatively, the fan or blower inflating the tubes can be turned off, allowing the tubes to deflate. When this is done, the tubes will be suspended in spaced relationship to each other, permitting warm air to flow up into contact with the roof undersurface.

It will also be apparent that, in addition to providing an insulating heat barrier, the inflated tubes also serve to reduce the overall volume of the structure in which they are installed, thus reducing the amount of space that must be heated.

These and other features and advantages of the invention will be apparent from the following description.

BRIEF DESCRIPTION OF THE DRAWINGS

FIG. 1 is a perspective view of a portion of a building structure insulated in accordance with the present invention;

FIG. 2 is an elevational view of a portion of a tubular member used in the present invention;

FIG. 3 is a cross-sectional view through a tubular member in its deflated condition;

FIG. 4 is a view similar to FIG. 3, but showing the tubular member inflated;

FIG. 5 is a perspective view showing the manner of tying an end of a tubular member;

DESCRIPTION OF THE PREFERRED EMBODIMENTS

Figure 6:
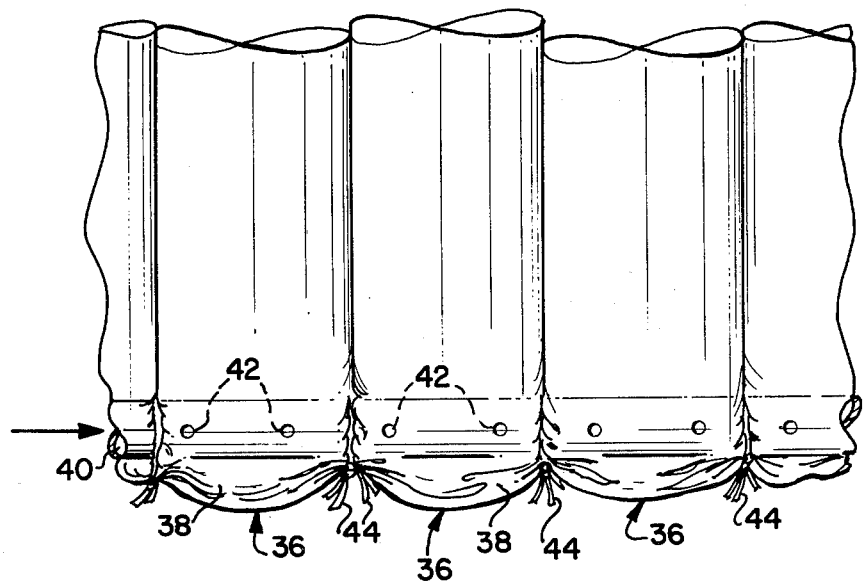
FIG. 6 is a view showing the open ends of the tubular members attached to a perforated conduit.

As seen in FIG. 1 of the drawings, a building structure 10, herein shown as a greenhouse with glass roof panels 12, is provided with supporting posts or columns 14 and bar joists or other supporting structural members 16. While a greenhouse is shown for purposes of illustration, it will be apparent that the present invention is applicable to a variety of structures other than greenhouses and will function in essentially the same manner as described below.

A series of supporting wires 18 are strung between members 16, and extending at right angles to the wires 18 and suspended therefrom are tubular insulating members 20.

Members 20, as best seen in FIGS. 2 through 4 of the drawings, include an inflatable main body portion 22 and an outwardly projecting, integrally formed seam 24 extending co-extensively with the main body portion 22. Seam 24 can conveniently be formed by a heat sealing unit positioned just downstream of an extruder manufacturing the blown plastic tubing.

As best seen in FIG. 2, seam 24 may be pierced at any desired point to allow passage of the lower ends of double hooks 28, whose upper ends loop over the supporting wires 18. As also seen in FIG. 2 of drawings, the areas around the openings 26 may be reinforced with tape or the like 30.

As seen in FIG. 5 of the drawings, one end 32 of each of the tubular members can be conveniently closed by simply gathering the material at the end of the tube together and wrapping it with some form of tie 34. The opposite ends 36 of the tubes are split upwardly to form a pair of opposing flaps 38, only one flap of each pair being visible in FIGS. 1 and 6, which flaps are thereafter brought down around a pipe 40 having a series of openings 42 formed through it throughout its length. The ends of each of the flaps 38 can be rolled together a few turns and then ties 44 of any convenient form can be used to secure the split ends of the tubes about the conduit 40.

With this construction the interiors of the inflatable main portions 22 of the tubular members are in communication with the conduit 40 so that air pumped from a low pressure fan or blower 46 inflates the tubes into contacting relationship with each other to form a substantially continuous barrier against heat loss through the roof 12 of the structure.

Figure 7:
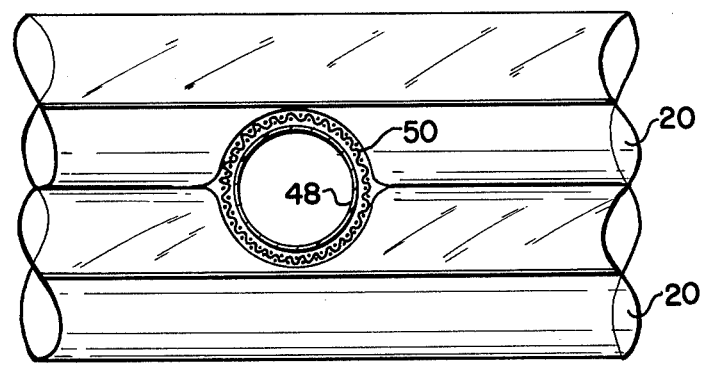
FIG. 7 is a plan view along line 7—7 of FIG. 8 showing a pipe passing up between adjacent tubular members.
Figure 8:
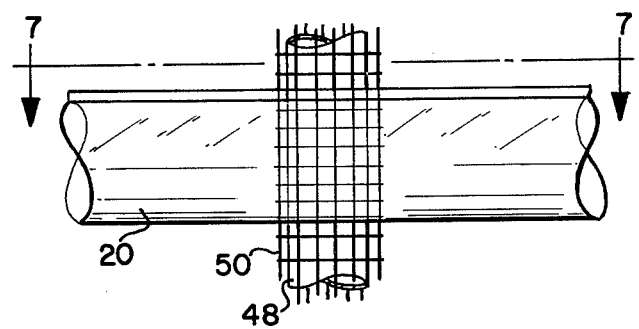
FIG. 8 is a elevational view of the structure of FIG. 7.

As indicated, the source of pressure for inflating the tubes can be low pressure, and this not only provides an economy in the cost of the blower or fan used, but also, because of the low internal pressure within the tubes, they conform readily about pipes or other conduits extending from beneath the barrier up into the area between the barrier and the roof. This is illustrated in FIGS. 7 and 8 where a stove pipe 48 is pictured as passing upwardly between adjacent tubes 20, with the stove pipe being spaced from the surfaces of the tubes by a wire mesh cage 50.

This characteristic of the low pressure, inflatable tubes also prevents the collection of condensate above the tubes since such condensate merely drains down around the tubes. Additionally, if it is desired to heat the roof 12, a pipe can be inserted up between the tubes, similarly to the illustration in FIGS. 7 and 8, and warm air pumped up into the space between the roof and the barrier formed by the tubes.

Alternatively, the fan or blower 46 can simply be turned off, allowing the tubes to deflate to the configuration shown in FIG. 3 of the drawings and at the left hand side of FIG. 1, whereby warm air within the building can pass up between the spaced, deflated tubes to heat the roof 12.

While the tubes are shown in FIG. 1 of the drawings as extending beneath the roof and then downwardly along the side wall of the building, it will be apparent that the conduit 40 could be positioned at the upper edge of the wall and the tubes attached to it at that point rather than extending the tubes vertically downwardly.

From the above it will be apparent that the present invention provides an improved means of insulating a building structure which is efficient, inexpensive and relatively simple to install and maintain.

While the forms of apparatus herein described constitute preferred embodiments of the invention, it is to be understood that the invention is not limited to these precise forms of apparatus, and that changes may be made therein without departing from the scope of the invention.

What is claimed is:

1. In combination with an existing, enclosed building structure having a substantially continuous roof, the improvement comprising:

a plurality of elongated tubular members transformable between an inflated, substantially circularly cross-sectioned configuration and a deflated, non-circularly, cross-sectioned pendant configuration of substantially the same peripheral cross-sectional dimension as said circular configuration, each of said tubular members including an inflatable main body portion and a substantially flat, uninflated attaching flange projecting outwardly from said main body portion, means for suspending said tubular members by said attaching flanges beneath and in spaced relationship to said substantially continuous roof, whereby said tubular members are protected by said roof, said tubular members in said inflated configuration thereof having a greater portion thereof positioned closer to said roof than in said deflated pendant configuration thereof, an apertured conduit for selectively maintaining said tubular members in said inflated condition, ends of said main body portions of said tubular members being slit inwardly to form opposed pairs of flaps, and said flaps extending about said tubular conduit to place it in communication with said main body portions of said tubular members.

2. The combination of claim 1 wherein ends of said flaps are rolled together and tied to secure said ends of said main body portions of said tubular members to and in communication with said tubular conduit.

* * * * *